United States Patent [19]
Westerman et al.

[11] Patent Number: 5,442,156
[45] Date of Patent: Aug. 15, 1995

[54] HEATING APPARATUS FOR COMPOSITE STRUCTURE REPAIR

[75] Inventors: Everett A. Westerman, Auburn; Phillip E. Roll, Kent, both of Wash.

[73] Assignee: The Boeing Company, Seattle, Wash.

[21] Appl. No.: 18,466

[22] Filed: Feb. 16, 1993

Related U.S. Application Data

[63] Continuation of Ser. No. 682,637, Apr. 9, 1991.

[51] Int. Cl.6 .............................................. H05B 3/78
[52] U.S. Cl. .................................... 219/243; 392/443;
392/447; 156/285; 156/583.1; 165/104.19
[58] Field of Search ....................... 165/104.19, 104.23,
165/104.11, 104.19; 219/243, 528, 535;
392/339, 344–346, 443–445, 447; 338/231;
607/96, 114; 5/451; 156/94, 285, 499, 583.1,
583.7, 583.9; 118/59, 101

[56] References Cited

U.S. PATENT DOCUMENTS

| | | | |
|---|---|---|---|
| 2,294,010 | 8/1942 | Van Daam | 219/535 |
| 3,014,117 | 12/1961 | Madding | 219/535 |
| 3,016,446 | 1/1962 | Kalbach | 128/399 |
| 3,025,208 | 3/1962 | Geiger | 156/382 |
| 3,569,669 | 3/1971 | March | 219/211 |
| 3,661,683 | 5/1972 | Engel et al. | 156/580 |
| 3,837,965 | 9/1974 | Mahon et al. | 156/382 |
| 3,875,373 | 4/1975 | Lowery et al. | 219/526 |
| 4,198,559 | 4/1980 | Walter et al. | 392/39 |
| 4,201,218 | 5/1980 | Feldman | 219/528 |
| 4,352,707 | 10/1982 | Wengler et al. | 156/359 |
| 4,408,558 | 10/1983 | Faber et al. | 118/59 |
| 4,511,425 | 4/1985 | Boyd et al. | 156/493 |
| 4,554,036 | 11/1985 | Newsom | 156/94 |
| 4,652,319 | 3/1987 | Hammond | 156/94 |
| 4,808,253 | 2/1989 | Mimbs | 156/98 |
| 4,816,106 | 3/1989 | Turris et al. | 156/285 |

*Primary Examiner*—Bruce A. Reynolds
*Assistant Examiner*—Michael D. Switzer
*Attorney, Agent, or Firm*—J. C. Hammar

[57] ABSTRACT

Apparatus for applying heat to a patch on a composite structure repair site is disclosed. The apparatus includes a sealed bladder containing both a thermally conductive fluid and a heating element in thermal contact with the fluid. The heating element which comprises a flexible sheet having an electrical resistance wire uniformly placed thereon can be immersed in the fluid or otherwise in direct thermal contact therewith. Electrical power is applied to the heating element by conductors passing through the bladder surface. The heating element of disclosed structure can be attached to seal the bladder interior into two reservoirs, to permit fluid flow throughout the bladder or to form at least one outer surface of the bladder. Flexible supports can also be attached from the heating element to an interior bladder surface to maintain spacing between the heating element and the surface. To prevent diffusion of the thermally conductive fluid, a separate container of thermally conductive fluid impermeable material can be placed inside the bladder. The outer bladder may be sealed by mechanical frame apparatus which compresses the bladder surface material at a perimeter thereof.

20 Claims, 3 Drawing Sheets

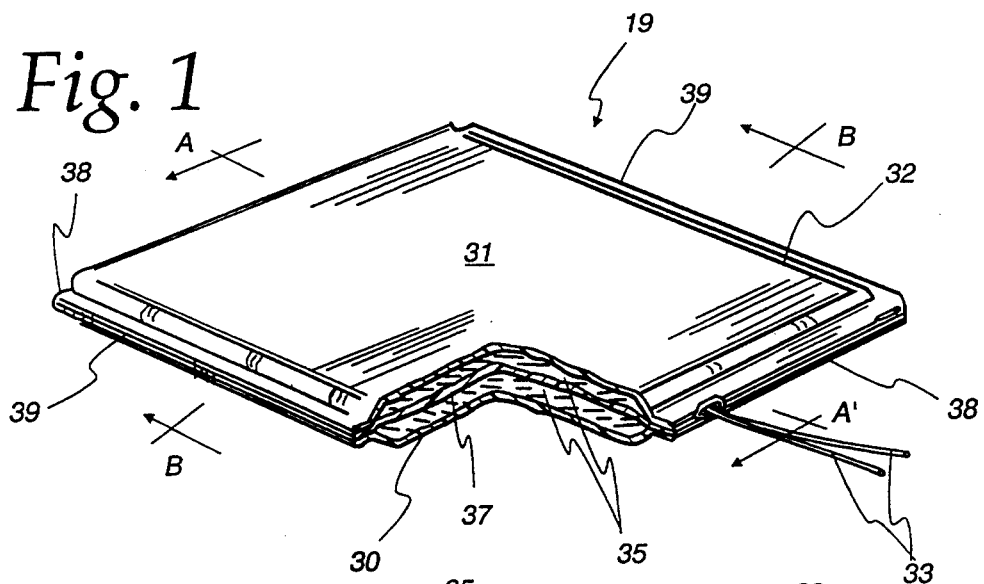
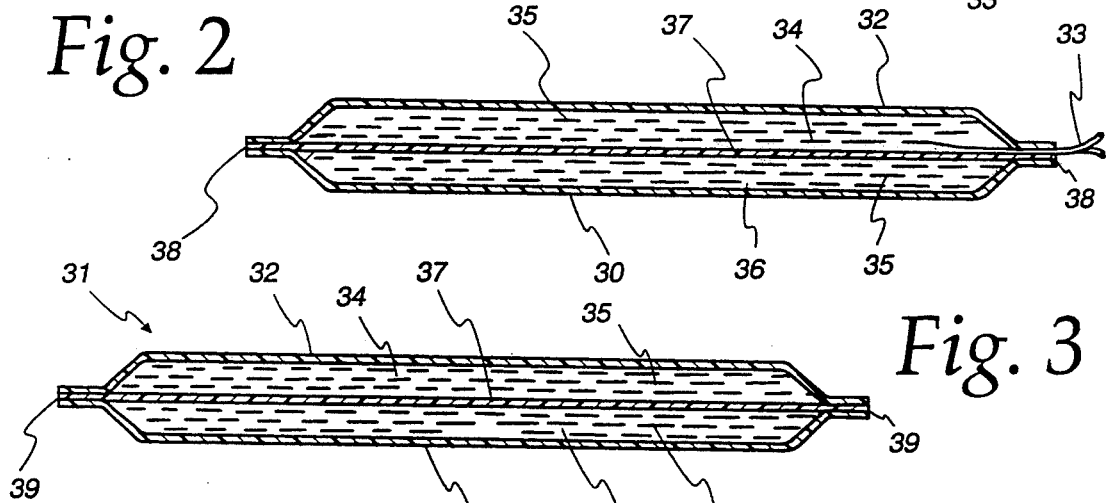
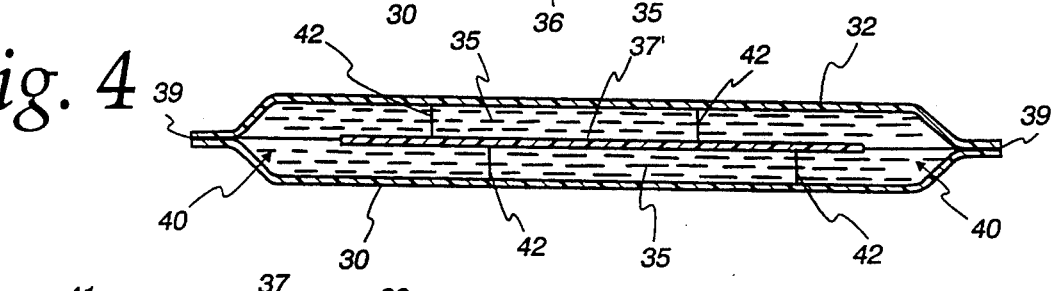
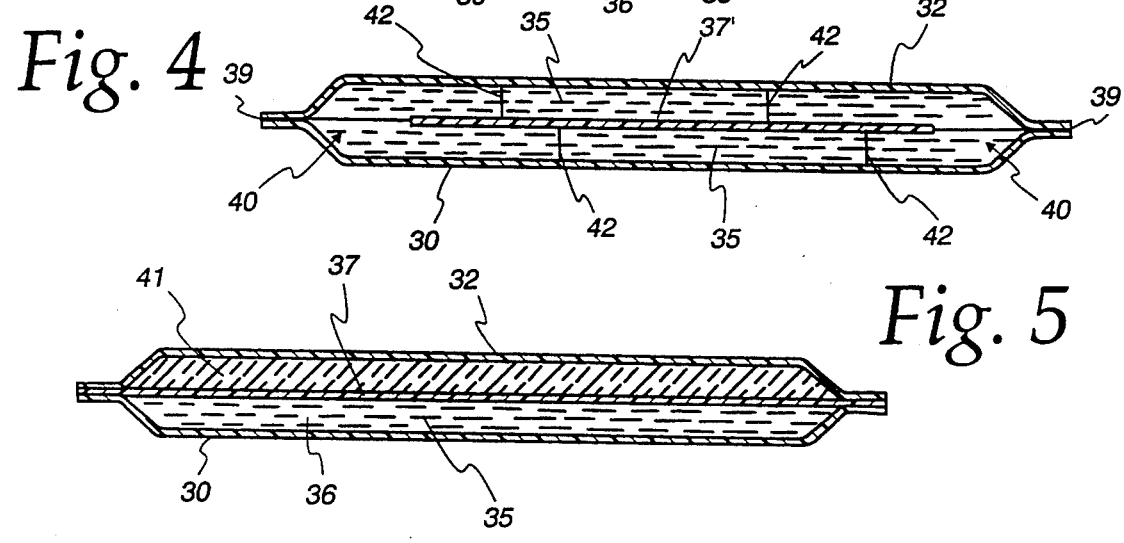
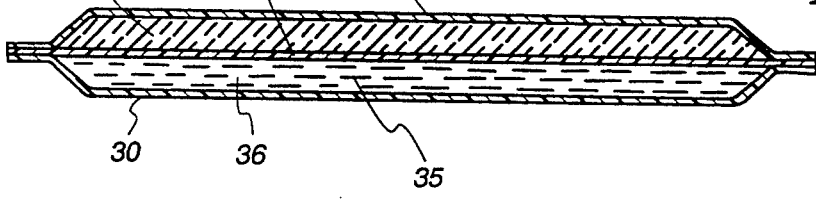

HEATING APPARATUS FOR COMPOSITE STRUCTURE REPAIR

This application is a continuation, of application Ser. No. 07/682,637, filed Apr. 9, 1991.

BACKGROUND OF THE INVENTION

The present invention relates to the repair of composite structures, and particularly, to improved methods and apparatus for applying heat to repair sites for the curing of such repair.

Composite structures of laminated material are increasingly being used in industry, and particularly, in the aircraft industry. From time to time, the composite structure will be damaged and need repair. Repair typically involves the removal of damaged material and covering the repair site with layers of woven material, such as graphite, which have been impregnated with mixed epoxy/resin. The new material and the adhesive are then pressed into place and heat cured. Pressure conforms the new material to the existing material and heat curing properly sets the resin or adhesive. When correctly done, heat curing involves a controlled ramp-up to a predetermined temperature which is held for a period of time followed by a controlled ramp-down to a lower temperature.

Controlling the accuracy of pressure, temperature and time for a repair is important to the strength of repair. Improper temperature control can substantially impact repair strength. A temperature ramp up, which is not properly controlled can shock and weaken the composite structure being repaired. Curing temperatures lower than desired result in poor bonding and temperatures higher than desired can result in burning both the repair patch and the material being repaired. A combination of these effects can be found at a repair site which is subjected to uneven temperatures.

Heat can be applied to a repair site by placing electrical resistance heating blankets directly over the entire repair patch area. When known heating blankets are laid over a repair site, they tend to heat the site unevenly, making improper curing possible. In one study, an aircraft skin was heated by direct contact with a heating blanket and a 95° F. temperature variation was detected under the blanket when the skin was heated to a nominal 360° F. In a second study, in which a copper foil heat conductor was inserted between the heating blanket and the aircraft skin, a 65° F. variation was found. Proper curing is not possible with such a large temperature variation.

The difficulties of achieving even heating are compounded by uneven thermal characteristics at a repair site. For example, a portion of a repair site may consist of aircraft skin only, while another portion may consist of aircraft skin having an underlying support member. The support member tends to cool the skin to which it is attached causing uneven temperatures across the repair site. Multi-zone heating blankets have been used to provide different amounts of heat to different portions of a repair site in an attempt to provide even temperatures to areas having varying thermal characteristics. Such multi-zone heating blankets however, require complex control systems for the multiple heating zones of the blanket, and importantly, must be specifically configured to provide heating characteristics corresponding to the thermal characteristics of different areas of the repair site. Providing complex controls and many different configurations of multi-zone heating blankets is a problem for repair centers.

Another system for repairing composite structures is disclosed in United States Patent 4,808,253 to Mimbs. The Mimbs system discusses placing a heating blanket on top of a thermally conductive fluid-filled envelope and distributing heat and pressure to a repair site through the envelope. As disclosed, the envelope is primarily used to conform the repair assembly to contoured shapes. The Mimbs system does not result in a sufficiently accurate temperature control. Overlaying the envelope with a conventional heating blanket creates multiple heat transfer interfaces resulting in inefficient and inconsistent heat transfer to the fluid in the envelope. The heating inefficiencies can result in inability to achieve either an accurate heat ramp-up or actual curing temperatures in the order of 350° F. Additionally, no means of measuring heat ramp-up or curing temperature is shown by the Mimbs Patent.

A need exists for composite repair apparatus which can achieve accurate heat ramp-up and sufficiently uniform temperatures at a repair site to achieve proper bonding between patch material and the structure being repaired.

SUMMARY OF THE INVENTION

A heating apparatus in accordance with the present invention comprises, as a single unit, a sealed bladder containing a thermally conductive fluid and an electrical heating element in thermal contact with the thermally conductive fluid. The multiple heat transfer interfaces of prior arrangements are avoided by the construction of the apparatus, in which the heating element is in substantially direct thermal contact with the thermally conductive fluid. As electrical power is applied to the heating element, the thermally conductive fluid is efficiently heated due to the relatively direct thermal contact with the heating element and the temperature applied to a repair site by the apparatus can be accurately ramped to the desired cure temperature. In one configuration, the heating element is immersed in the thermally conductive fluid and heat from both sides of the heating element is absorbed by the fluid, thereby increasing the heating efficiency. In addition to heating efficiency, substantially equal temperatures are maintained across the repair site by conductive and convective heat transfer through the thermally conductive fluid, even on repair sites having non-uniform heat transfer characteristics.

The source of electrical power for the heating element is generally external to the bladder and power is conveyed to the heating element by wires which pass through sealing arrangements at the surface of the bladder. Arrangements are also provided for pressing the heating apparatus against the repair site to improve bonding. The heat applied to the repair site and patch is monitored by a temperature sensing device at the repair site to regulate the power applied to the heater.

The sealing arrangements for the bladder may be comprised of silicone based adhesives and/or heat curing processes such as vulcanization. Separately or in conjunction with other sealing arrangements, bladder seals can include a pair of semi-rigid frames having substantially the same perimeter as the bladder. The frames are urged together with the bladder surfaces therebetween so that compression of the bladder surfaces by the frames provides the necessary seal to contain the thermally conductive fluid.

The heating element comprises a resistance wire which is substantially uniformly distributed on a support sheet. The support sheet is attached to the inside of the bladder. When the silicone rubber-based bladder and support sheet are used, such attachment is by means of heat curing of the silicone rubber by a process such as vulcanization.

In one embodiment, the support sheet is attached around an interior perimeter of the bladder to form two reservoirs which are sealed from one another. One of the reservoirs is placed on contact with the repair site, and the other provides increased thermal mass to improve the heating characteristics of the apparatus. In an alternative embodiment, the support sheet is connected at selected points to the interior of the bladder in a manner which allows thermally conductive fluid to circulate between the reservoirs and around the heating element. Additionally, flexible supports can be attached between the support sheet and the bladder internal surface, to control the separation distance between the bladder surface and the heating element. The resistance wire of the heating element may even be suspended in the bladder without being attached to a support sheet so that the thermally conductive fluid is essentially in a single reservoir.

It is possible that a chosen thermally conductive fluid will diffuse through a chosen bladder material. To avoid this problem, a sealed, flexible inner container, which is impermeable to the thermally conductive fluid, is provided to contain the fluid. Specifically, when beeswax is employed as the thermally conductive fluid, a sealed inner container of polyamide film, such as UPILEX or KAPTON can be used.

A heating apparatus in accordance with the present invention, can also include a bladder surface sheet which incorporates a flexible electrical heating element. One surface of the heating element is substantially directly in thermal contact with the thermally conductive fluid in the bladder thereby avoiding multiple thermal interfaces. The other surface of the integrated bladder surface and heater element is insulated to improve thermal efficiency of the apparatus.

BRIEF DESCRIPTION OF THE DRAWINGS

FIG. 1 is a perspective view of an apparatus for applying heat to a repair site;

FIG. 2 is an end sectional view of the apparatus of FIG. 1;

FIG. 3 is a side sectional view of the apparatus of FIG. 1;

FIG. 4 is a side sectional view of a second embodiment of the apparatus of FIG. 1;

FIG. 5 is a sectional view of a third embodiment of a heat transfer apparatus for use in composite repair;

DETAILED DESCRIPTION OF THE PREFERRED EMBODIMENT

The repair of composite structures is a difficult procedure requiring relatively precise temperatures for predetermined time intervals in order to produce a satisfactory repair. Before describing the novel heating apparatus of the present invention, the repair process and the temperature versus time relationships are described so that the necessity for accurate temperature control can be appreciated.

Figure 6:
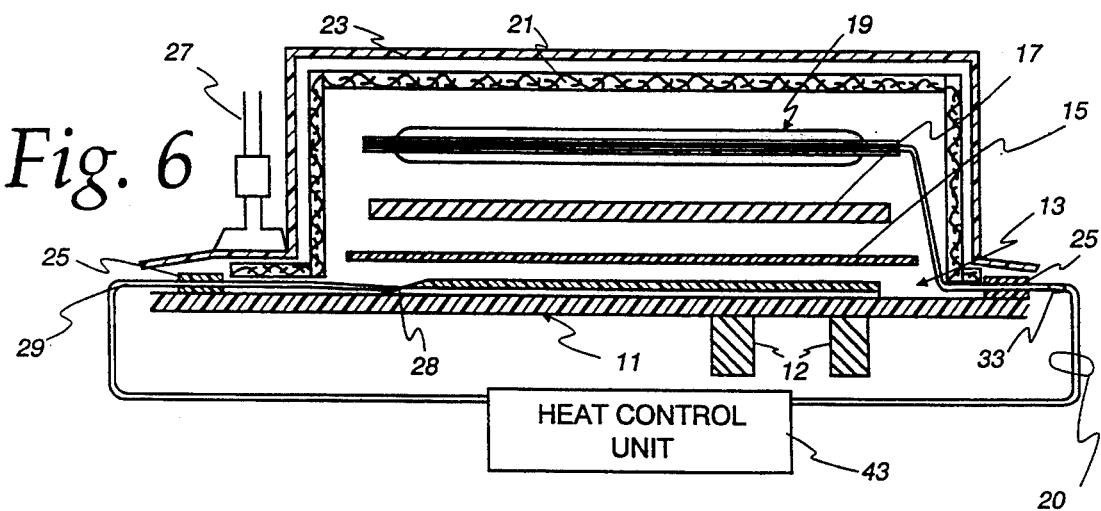
FIG. 6 is a sectional view of components utilized in the repair of composite structures.

FIG. 6 is a sectional view of an arrangement of components used in the repair of a composite material substrate 11 having underlying support members 12. After the area to be repaired is cleaned of old material and properly shaped, a patch 13, comprising layers of resin impregnated repair material is placed over the prepared area. On top of the patch 13, a layer of porous separator film 15 is added to promote the separation of the components from the patch 13 at the conclusion of the repair process. Above separator film 15 is an optional caul plate 17 which is used to evenly distribute pressure applied to the patch 13. Above the caul plate 17, is a heating unit 19 which provides controlled heating of patch 13 and the surrounding substrate 11 to cure the adhesive/resin for a good bond between the substrate and the patch. Heating unit 19 is an electrical resistance heat blanket which receives electrical power from a heat control unit 43 via electrical conductors 20. The heating unit 19 is covered with breather plies 21 which are in turn, covered with a vacuum sheet 23. Vacuum sheet 23 is sealed to the substrate 11 around the perimeter of the repair site by a sealing compound 25 and a vacuum probe 27 is applied to the vacuum sheet. A vacuum source (not shown) is connected to the probe 27 and withdraws gases between the vacuum sheet 23 and the substrate 11. Breather plies 21 provide a path to promote the removal of these gases. The lowered pressure between the vacuum sheet 23 and the substrate 11, brings all of the repair components into tight physical contact; and thereby applies a predetermined pressure on the patch 13 to aid in proper bonding. Also shown in FIG. 6 is a temperature sensing device 28, which is electrically connected outside of the vacuum sheet 23 by conductors 29 to a heat-control unit 43. The heat control unit 43 responds to signals from the temperature sensing device 28 to control the amount of power supplied to heat source 19 over conductors 20. In the preferred embodiment, temperature sensing device 28 is a thermocouple.

Figure 7:
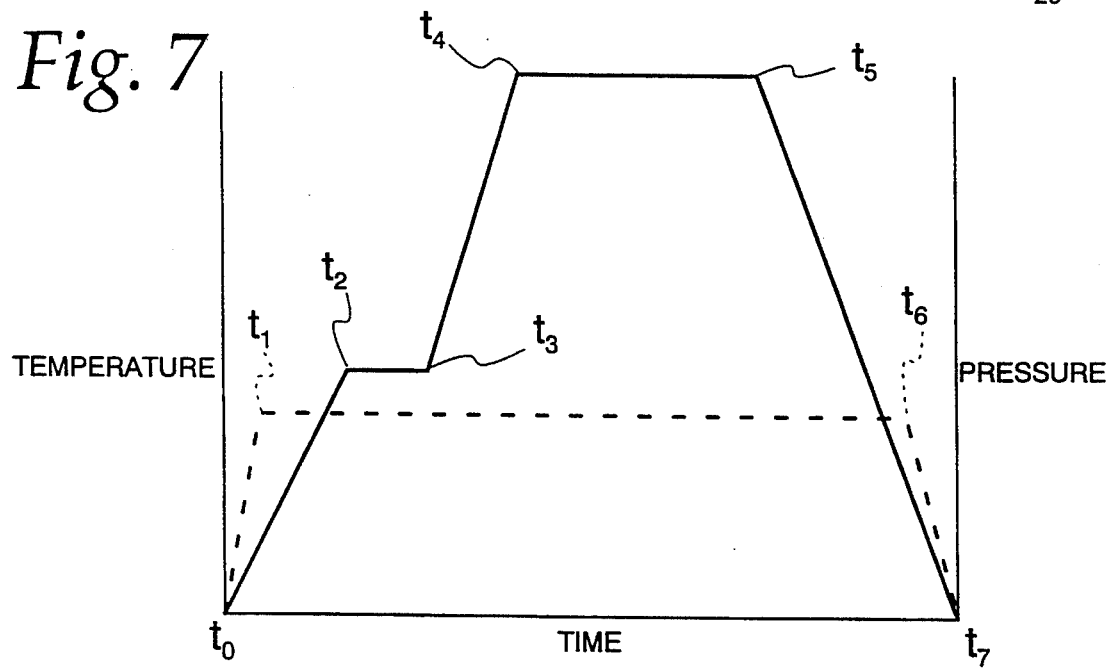
FIG. 7 shows pressure and temperature variations with time of a cure cycle used in composite repair.

FIG. 7 shows the application of heat and pressure to the repair site as a function of time in what is referred to as a cure cycle. The dotted line represents pressure applied to patch 13 and the solid line represents the temperature of the repair site. All temperatures referred to in the present description are in degrees Fahrenheit. At $t_0$, the evacuation of the volume under vacuum sheet 23 begins and power is applied to the heating unit 19 to increase the temperature. At a time $t_1$ the pressure applied to the patch is adequate for the repair and further evacuation of the volume by the vacuum source merely maintains a constant pressure on the patch 13. The temperature increase is controlled between $t_0$ and $t_2$ to achieve a first temperature ramp-up within specified limits of approximately 1° to 5°0 per minute. When a temperature of, for example, 150°, is achieved at time $t_2$ the temperature is held constant until time $t_3$ in a hot, debulking step. Temperature and pressure are maintained during hot debulking to draw out reaction gases and compact the repair plies to insure the quality of the bond line. At the end of hot debulking at $t_3$ the temperature is again ramped up toward the curing temperature at the relatively slow rate of 1°-5° per minute. The curing temperature of, for example 350°, is achieved at $t_4$ and the temperature is held constant for a predetermined period of time ending at $t_5$. At the end of the curing time, the patch and substrate are allowed to cool at 1° to 5° per minute to room temperature at $t_7$ to complete the repair. The pressure is released at the time $t_6$.

During both the ramp-up and constant temperature phases of the curing cycle, the temperature over the entire repair site 11 should be substantially equal to assure proper bonding. The present invention is a heat element 19 which substantially evenly heats the patch and the substrate of a repair site, is capable of providing curing temperature of 350° or more, and is controllable to accurately provide desired temperature ramp-up, dwell and ramp-down to assure good bonding.

FIG. 1 is a perspective view of a heating unit 19 for use in the repair assembly of FIG. 6. The heating unit 19 in FIG. 1 comprises a sealed, silicone rubber bladder 31 containing a thermally-conductive medium. Preferably, the thermally-conductive medium is a liquid at the curing temperatures of interest. Beeswax, which is a fluid at approximately 140° has been found to be a good, thermally-conductive medium in the present embodiment.

FIG. 2 is a sectional view of heating unit 19 taken along section line A--A' of FIG. 1. Heating unit 19 includes an electrical heating element 37 which is energized via a pair of conductors 33. Heating element 37 comprises a cloth-reinforced, silicone rubber sheet with a length of resistive wire, such as nichrome wire, embedded in the silicone on one surface. To produce even heating, the nichrome wire is substantially uniformly disposed over the surface of the sheet. Bladder 31 is constructed of two sheets 30 and 32 of silicone rubber each of which has an area slightly larger than that of heating element 37. The bladder 31 is formed by bonding upper sheet 32, lower sheet 30 and the heating element 37 at the perimeter of the heating element 37. The conductors 33 are brought out through the seam and sealed in the bonding process. Bonding between the sheets is achieved by a heat curing process such as vulcanizing. The upper and lower sheets 32 and 30 are slightly larger than the heating element 37 so that an upper reservoir 34 is formed between the heating element 37 and the upper sheet 32, and a lower reservoir 36 is formed between the heating element 37 and the lower sheet 30. After assembly of the heating unit 19, both the upper and lower reservoirs of bladder 31 are filled with thermally-conductive fluid 35. The openings which are required for such filling are sealed upon completion. The amount of fluid in each reservoir is such that approximately one-half of an inch is present above and below heating element 37 when the filled bladder 31 rests as shown on a horizontal surface. FIG. 3 is a sectional view of bladder 31 taken along section lines B--B' of FIG. 1. It can be seen from FIGS. 2 and 3 that heating element 7 of this embodiment is sealed around the entire internal perimeter of bladder 31 and thus prohibits any fluid communication between upper reservoir 34 and lower reservoir 36.

As electrical current runs through conductors 33 and the resistive wire of heating element 37, the thermally conductive fluid 35 heats quickly through the close contact between the heating element 37 and the fluid. When the bladder 31 is placed over a patch and substrate, relatively even temperature is maintained at the patch contacting surface due to the closeness of the heating element to that surface and the conductive and convective heat exchange through the fluid within the bladder 31. Although the upper reservoir may not be in contact with the patch being cured, it provides additional thermal mass to stabilize the temperature variation in the heating element. In an arrangement similar to that shown in FIG. 6 using the heating apparatus of FIG. 1, in which the heating element 37 was capable of 7.5 to 10 watts per square inch, the previously disclosed temperature ramp-up was achieved and the temperatures at the repair site were maintained within approximately 30° at a 360° curing temperature. Additionally, the evenness of temperature permits repair site temperature regulation using a single thermocouple e.g., 28 of FIG. 6.

In the previously described embodiment, two separate reservoirs 34 and 36 of thermally-conductive fluid are employed to provide accurate and uniform heating. FIG. 4 shows a side, sectional view taken along section line B--B' of FIG. 1 of a second embodiment of the heating apparatus of FIG. 1. In the second embodiment, bladder 31 comprises a single reservoir of thermally-conductive fluid in which heating element 37' is immersed. The heating apparatus of FIG. 4 allows thermally-conductive fluid to circulate throughout the single reservoir of the bladder 31.

The heating apparatus of FIG. 4 is assembled in a manner substantially similar to that of the prior embodiment, except that the heating element 37' is not as wide as the distance between edges 39. The heating element 37' extends from one edge 38 to the opposite edge 38 of the bladder and is sealed into these edge seams. The heating element 37' does not, however, extend from edge 39 to the opposite edge 39. Accordingly, two regions 40 are left open for fluid circulation around the heating element 37'.

Fluid circulation around the heating element 37' tends to improve the ability of heating unit 19 to provide equal temperatures. However, the heating element may become displaced on contoured or irregular surfaces. To limit the possible displacement of heating element 37', flexible supports 42 can be bonded between the heating element 37' and the interior of the bladder. The supports 42 control the spacing between the upper and lower bladder surfaces 32 and 30 and do not substantially restrict fluid circulation. Fluid circulation around heating element 37' can also be achieved by means of apertures through the heating element itself.

FIG. 5 shows an additional embodiment in which one side of heating element 37 is exposed directly to the thermally-conductive fluid as in the prior embodiments, and the other side of the heating element is insulated. The apparatus of FIG. 5 is assembled in a manner substantially similar to that of FIGS. 1 through 3, except that the upper reservoir is filled with insulating material 41 such as fiberglass insulation before the top sheet 32 of the bladder is bonded to the heating element 37 and the bottom sheet 30. After vulcanization, the bottom reservoir is filled as before with thermally-conductive fluid 35. Although the apparatus of FIG. 5 does not have as large a thermal mass as prior embodiments, the integration of insulation, heating element and temperature-conductive fluid provides for efficient use and uniform temperature distribution characteristics.

Figure 8:
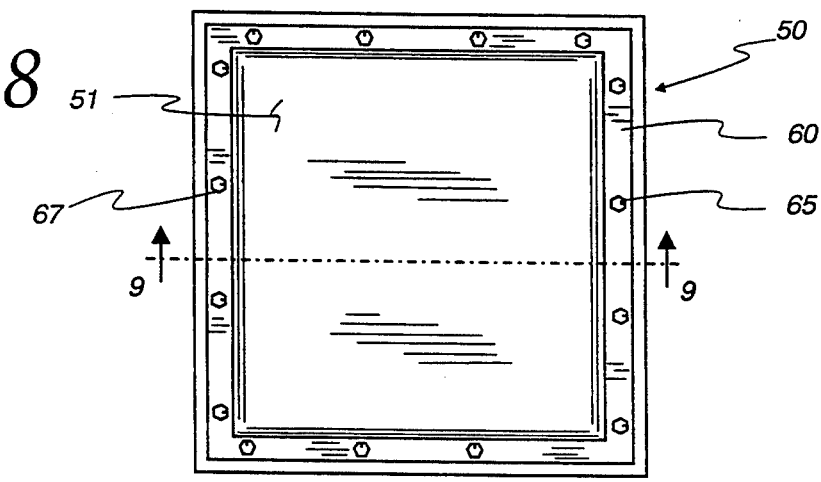
FIG. 8 is a plan view of a heating apparatus including a compression type sealing fixture.
Figure 9:
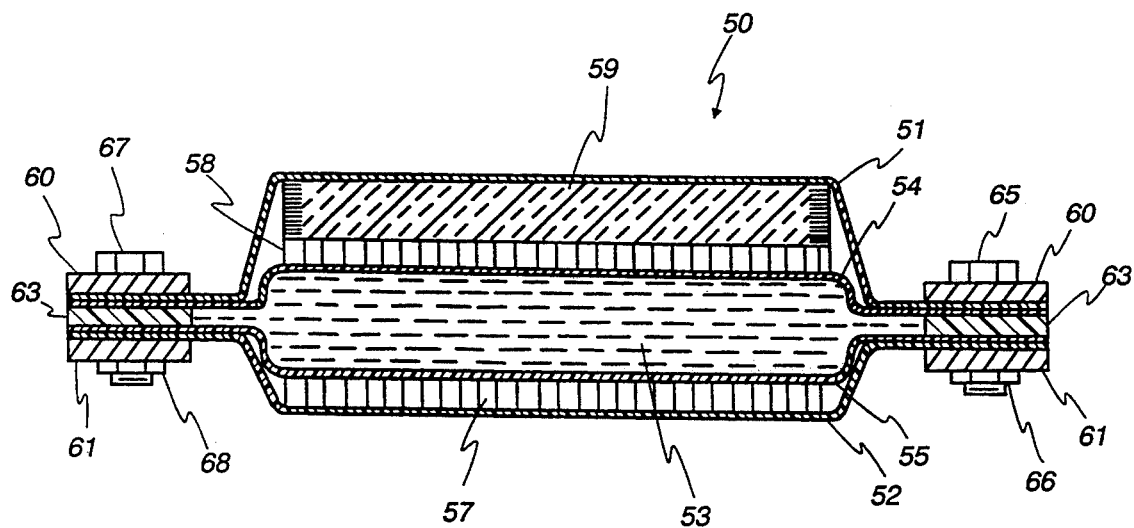
FIG. 9 is a cross-sectional view of the apparatus of FIG. 8.

Construction of the exterior bladder of the heating apparatus from relatively thin (0.06") sheets of silicone rubber makes the bladder surfaces flexible for ease of use, but the thermally conductive fluid may diffuse through the sheets. FIGS. 8 and 9 show a heating apparatus 50 which incorporates arrangements for preventing such thermally conductive fluid diffusion and for increasing the heating capacity of the bladder.

Heating apparatus 50 of FIGS. 8 and 9 is of substantially rectangular shape and comprises two silicone rubber sheets 51 and 52 to form the exterior of the bladder. As shown in FIG. 9, the thermally conductive fluid 53 is sealed within an internal bladder or container made from two sheets, 54 and 55, of a polyamide film such as UPILEX or KAPTON. The polyamide film, which is substantially impermeable to beeswax, is sealed around its perimeter so that the beeswax thermally conductive fluid 53 remains inside the inner bladder. The heating capability of the apparatus 50 is provided by a pair of electrical heating elements 57 and 58. Heating element 57 is disposed between the inner bladder 54, 55 and one surface 52 of the external bladder. The other heating element 58 is disposed on the opposite side of the inner bladder 54, 55 so that at least a portion of the inner bladder is "sandwiched" between the two heating elements. A layer of insulating material 59 is disposed between the heating element 58 and the sheet 51 of the outer bladder. In use, the surface 52 of the outer bladder is placed over the repair site.

The heating apparatus 50 is sealed by a mechanical sealing apparatus which may be used in conjunction with the previously mentioned sealing arrangements or may be provided as the exclusive bladder seal. The mechanical sealing apparatus comprises a pair of rectangular frames 60 and 61 of semi-rigid material, such as wood or aluminum, and a silicone rubber gasket 63 of the same shape as frames 0 and 61. During construction, the gasket 63 is placed between the polyamide sheets 54 and 55. The silicone rubber sheets 51 and 52 of the outer bladder are then placed on top of and beneath (FIG. 9 orientation) the gasket 63 and polyamide sheet 54 and 55 assembly. Frames 60 and 61 are then placed over and under the combined gasket and film combination, and threaded bolts, e.g., 65 and 67, are inserted through prefabricated matching holes in the frames 60 and 61 and the flexible members 51, 52, 54, 55 and 63. Compression forces are applied to the flexible members by means of threaded nuts 66 and 68 attached to the threaded bolts 65 and 67, respectively. It should be noted that a total of 16 bolt and nut combinations, as shown in FIG. 8, provide compressive forces around the entire perimeter of heating apparatus 50. The material used for frames 60 and 61 should be of sufficient rigidity to apply the compressive forces developed at the bolt and nut connections to the portions of the perimeter between such bolt and nut connections.

Figure 10:
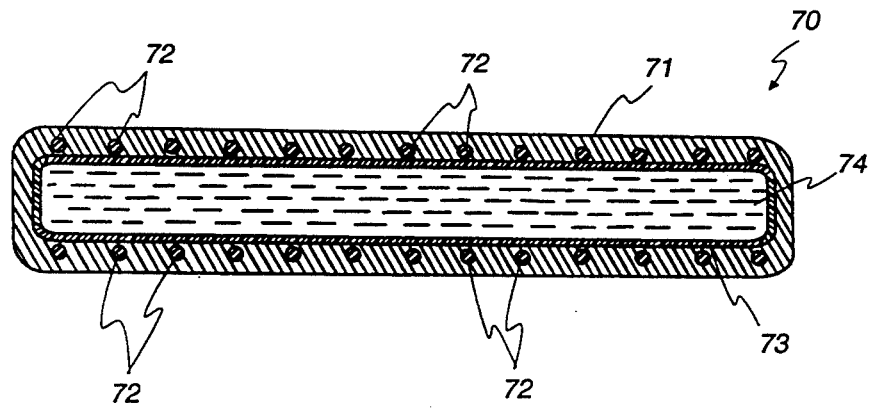
FIG. 10 is a sectional view of a heating apparatus incorporating the heating element as a part of the surface of the bladder.

FIG. 10 is a cross-sectional view of a heating apparatus 70 which includes electrical resistance heating wires 72 imbedded in the inner surface of the silicone rubber outer bladder 71. The heating wires 72 surround an inner, polyamide bladder 73 which holds the thermally conductive fluid 74. As with the heating apparatus 50, heat is applied to both surfaces of the thermally conductive fluid bladder 73. Heat application to both surfaces increases the heating capacity of the apparatus over that of a single heating surface while gaining advantage of the heat conveying properties of the thermally conductive fluid 74.

While a preferred embodiment of the invention has been illustrated, it will be obvious to those skilled in the art that various modifications and changes can be made without departing from the scope of the invention as defined in the appended Claims.

What is claimed is:

1. Apparatus for applying heat at temperatures above 300° F. to a repair site comprising:
    a pliable, sealed bladder in contact with said repair site:
    a thermally-conductive fluid in said bladder;
    an electrical heater immersed in said thermally conductive fluid for heating said thermally-conductive fluid to temperatures above 300° F., said electrical heater being substantially uniformly disposed within said bladder to permit circulation of the thermally-conductive fluid around said electrical heater; and
    said heated thermally-conductive fluid maintains said repair site at substantially even temperatures by conduction and convection within said thermally-conductive fluid wherein said thermally conductive fluid comprises beeswax.

2. The apparatus of claim 1 wherein said electrical heater comprises:
    a source of electrical power external to said bladder;
    heating means within the bladder;
    means for conveying said electrical power from said source to said heating means; and
    means for sealing said bladder around said electrical power conveying means.

3. The apparatus of claim 2 comprising means for sensing the temperature of at least one point at said repair site and means responsive to said temperature sensing means for regulating the electrical power conveyed to said heating means from said electrical power source.

4. The apparatus of claim 1 comprising means for pressing said bladder against said repair site.

5. The apparatus of claim 1 wherein said heated thermally-conductive fluid maintains the temperature of said repair site within a range of less than about 30° F. when the temperature of said thermally-conductive fluid is above 300° F.

6. The apparatus of claim 1 wherein said electrical heater comprises electrical resistance wire substantially uniformly disposed on a supporting sheet and means for attaching said supporting sheet to the interior of said bladder.

7. The apparatus of claim 6 wherein said attaching means attaches said supporting sheet to the interior of said bladder in a manner permitting said thermally conductive fluid to circulate throughout said bladder.

8. The apparatus of claim 6 wherein said attaching means comprises flexible supports connecting the surface of said supporting sheet to the interior of said bladder to maintain predetermined spacing therebetween.

9. The apparatus of claim 6 wherein said supporting sheet is substantially impermeable to said thermally conductive fluid and attached by said attaching means to the interior of said bladder to form a first reservoir for said thermally conductive fluid between a first portion of said bladder and a first surface of said supporting sheet and to form a second reservoir for said thermally conductive fluid between a second portion of said bladder and a second surface of said supporting sheet.

10. The apparatus of claim 9 wherein said bladder and said supporting sheet are made from silicone rubber.

11. The apparatus of claim 1 wherein said bladder is fabricated from silicone rubber.

12. Apparatus for applying heat at temperatures above 300° F. to a repair site comprising:
 a pliable sealed bladder impermeable to beeswax in contact with said repair site;
 a thermally-conductive fluid comprising beeswax in said bladder;
 an electrical heater inside said bladder and in thermal contact with said thermally-conductive fluid for heating said thermally-conductive fluid to temperatures above 300° F., said electrical heater being substantially uniformly disposed within said bladder to permit circulation of the thermally-conductive fluid around said electrical heater; and
 said heated thermally-conductive fluid maintains said repair site at substantially even temperatures by conduction and convection within said thermally-conductive fluid.

13. The apparatus of claim 12 wherein said electrical heater is in direct physical contact with said thermally conductive fluid.

14. The apparatus of claim 12 wherein said thermally conductive fluid is sealed within a flexible container fabricated from a material which is impermeable to said thermally conductive fluid, said flexible container being disposed within said bladder.

15. The apparatus of claim 12 wherein said bladder comprises first and second sheets of silicone rubber in contact at a common perimeter, and sealed by a sealing means at said common perimeter.

16. The apparatus of claim 15 wherein said common perimeter is substantially rectangular and said sealing means comprises first and second substantially rigid frame members of substantially the same rectangular shape as said common perimeter and means for urging said first and said second frame members together with said first and second sheets therebetween to seal said bladder.

17. Apparatus for applying heat at temperatures above 300° F. to a repair site comprising:
 a pliable sealed bladder comprised of silicone rubber in contact with said repair site;
 a thermally-conductive fluid in said bladder;
 an electrical heater inside said bladder and in thermal contact with said thermally-conductive fluid for heating said thermally-conductive fluid to temperatures above 300° F., said electrical heater being substantially uniformly disposed within said bladder to permit circulation of the thermally-conductive fluid around said electrical heater;
 said heated thermally-conductive fluid maintains said repair site at substantially even temperatures by conduction and convection within said thermally-conductive fluid; and
 said thermally-conductive fluid is comprised of beeswax sealed in a container fabricated from a flexible, beeswax impermeable material.

18. The apparatus of claim 17 wherein said beeswax impermeable material is a polyamide film.

19. Apparatus for applying heat at temperatures above 300° F. to a repair site comprising:
 a pliable sealed bladder in contact with said repair site;
 a thermally-conductive fluid sealed within a flexible container fabricated from a material which is impermeable to said thermally-conductive fluid, said flexible container being disposed within said bladder; and
 an electrical heater inside said bladder and in thermal contact with said thermally-conductive fluid;
 said electrical heater comprising a first heating means and a second heating means disposed within said bladder such that said first heating means is disposed between a first surface of said thermally-conductive fluid container and a first inner surface of said bladder, and said second heating means is in thermal contact with a second surface of said thermally-conductive fluid container, opposite said first surface of said thermally-conductive fluid container.

20. The apparatus of claim 19 comprising insulating material disposed between said second heating means and a second inner surface of said bladder.

* * * * *